E. J. KILEY.
VALVE.
APPLICATION FILED APR. 1, 1908.
991,784.
Patented May 9, 1911.
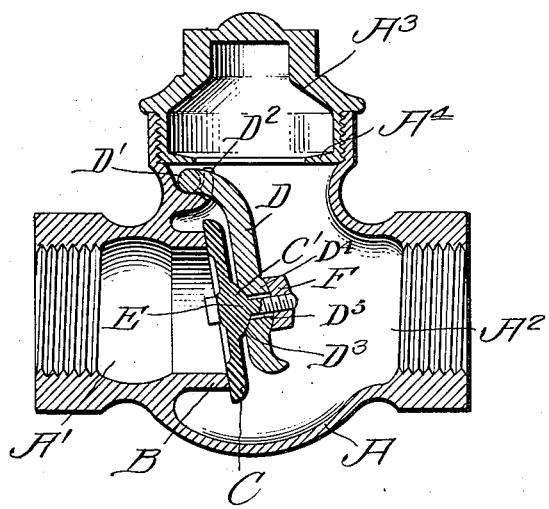
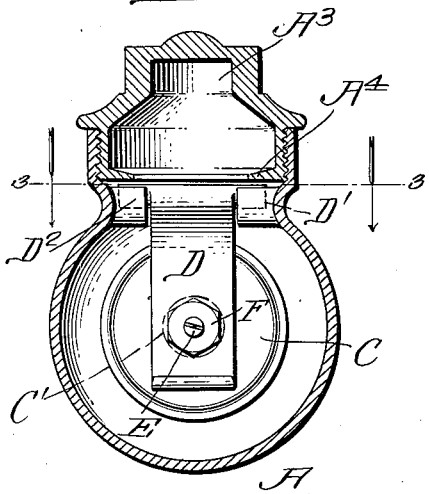
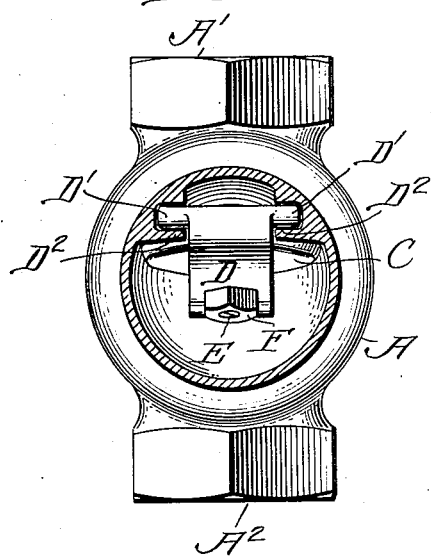
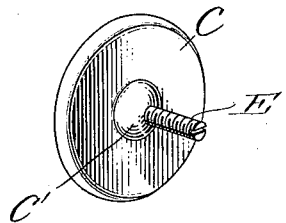
Witnesses
Oliver W. Holmes
E. B. McBath
Inventor
Edward J. Kiley,
By O'Brian Brock
Attorneys

UNITED STATES PATENT OFFICE.

EDWARD J. KILEY, OF PHILADELPHIA, PENNSYLVANIA, ASSIGNOR TO NELSON VALVE COMPANY, A CORPORATION OF PENNSYLVANIA.

VALVE.

991,784.  Specification of Letters Patent.  Patented May 9, 1911.

Application filed April 1, 1908. Serial No. 424,645.

*To all whom it may concern:*

Be it known that I, EDWARD J. KILEY, a citizen of the United States, and a resident of the city of Philadelphia, county of Philadelphia, and State of Pennsylvania, have invented certain new and useful Improvements in Valves, of which the following is a specification, reference being had to the accompanying drawing.
This invention particularly relates to check valves, and as is well known, any deflection of the pipe line including such a valve, such as is due to expansion or contraction of the pipe, tends to distort the valve body and consequently throws the valve seat out of its normal plane, which prevents the valve disk forming a tight joint with said seat.

The principal object of this invention is to obviate the difficulties above noted, and to provide a check valve with such supporting connection between the valve disk and its supporting hanger as will permit said disk to gyrate relative to said hanger, whereby said valve disk may adjust itself to the valve seat to insure a tight joint.

The form of this invention hereinafter described, comprises a valve body having suitable bearings cast therein, an oscillatory hanger having trunnions journaled in said bearings and provided with a concavo-convex portion forming a boss and a socket respectively in its opposite sides, a valve cap in threaded engagement with said valve body, and provided with a flange arranged to retain said trunnions in their respective bearings, a valve seat formed in unitary relation with said valve body, a valve disk arranged to engage said seat to close said valve, and comprising a boss forming a spherical segment arranged to fit the socket in said hanger, and having a threaded stud extending through an aperture of larger diameter than said stud in said hanger, and a nut in threaded engagement with said stud, and having a concave socket, arranged to fit the boss of said hanger.

This invention includes the various novel features of construction and arrangement hereinafter more definitely specified.

In the accompanying drawings, Figure 1 is a central vertical, longitudinal, sectional view of a check valve conveniently embodying this invention; Fig. 2 is a central transverse, vertical sectional view, showing the hanger in elevation; Fig. 3 is a plan sectional view taken on the line 3—3 in Fig. 2, and Fig. 4 is a perspective view of the valve disk *per se*.

In said figures, the valve casing A is provided with the threaded inlet A' and threaded outlet $A^2$ and comprises the valve seat B, and the bearings $D^2$ cast in unitary relation therewith, and said valve casing A is provided with the bonnet or cap $A^3$ which is in threaded engagement with said casing and which has the inturned flange $A^4$ which overlies the bearings $D^2$ and prevents the accidental displacement of the hanger D. Said hanger D is provided with the trunnions D' suitably journaled in the bearings $D^2$ and having the concavo-convex lower portion forming upon its respectively opposite sides, a socket $D^3$ and a boss $D^4$ having concentric surfaces substantially conforming to the surfaces of spherical segments. Said hanger D conveniently supports the valve disk C having the boss C' substantially forming a spherical segment, arranged to fit the socket $D^3$ and a threaded stud E in unitary relation with said disk. Said stud extends loosely through the aperture $D^5$ in said hanger D and is loosely engaged therewith by the nut F, which is in threaded engagement with the stud E and is provided with a concave face arranged to loosely engage the convex surface of the boss $D^4$. It may be here noted that the valve disk C' is capable of shifting to different planes or gyrating with respect to the hanger D and is thereby capable of adjusting itself to tightly fit the seat B in whatever plane said seat may occupy, and its gyratory movement is limited by the extent of play of said stud in the aperture in said disk.

The stud E is provided with a slot which may be engaged by a screw driver or like implement to rotate the valve disk from the hanger side, and said valve disk is provided on its opposite face with an oblong projection E' disposed opposite to the stud E and by means of which the valve disk may be rotated from the side opposite to that from which the stud E extends.

It may be observed that by reason of the spherical connections between the hanger and the valve disk, and the loose relation of the stud E which extends through the relatively large aperture $E^2$ in the hanger, that said disk C while supported by the hanger D and retained therewith by the nut F, it is free to gyrate with respect to said hanger D and therefore its tight jointed connection with the face of the seat B is thus insured. Moreover, the nut F may be adjusted to vary frictional engagement of the valve disk and its hanger.

It is not desired to limit this invention to the precise details of construction and arrangement herein set forth, as it is obvious that various modifications may be made therein without departing from the features of the invention as defined in the appended claims.

Having thus described my invention, I claim:

1. In a valve having a seat, the combination with a valve disk having a plane face arranged to engage said seat, and provided with a boss forming a spherical segment and a threaded stud in unitary relation therewith, of a hanger having an aperture for said stud of substantially larger diameter than said stud, surrounded by a concavo-convex portion whose opposite surfaces are concentric with said boss and one of which forms a socket for said boss, and a nut in threaded engagement with said stud, having a concave face engaging said convex surface and loosely retaining said boss in said socket.

2. In a valve having a plane seat, the combination with a valve disk having a plane face arranged to engage said seat, and provided with a boss forming a spherical segment and a threaded stud on its opposite face, of a hanger having an aperture for said stud of larger diameter than said stud, surrounded by a concavo-convex portion whose opposite faces are concentric with said boss, and whose concave face forms a socket therefor, and a nut in threaded engagement on said stud arranged to loosely engage said convex surface and loosely retain said boss in said socket, and supporting said valve disk in movable relation therewith, the movement of said disk being limited by said stud.

3. In a valve having a seat, the combination with a valve disk having a plane face arranged to engage said seat and provided with a boss forming a spherical segment and a threaded stud in unitary relation therewith, of a hanger loosely pivoted in said valve having an aperture through which said stud extends, surrounded by a concavo-convex portion whose opposite faces are concentric with said boss, and whose concave face forms a socket therefor, and a nut in threaded engagement with said stud having a concave face engaging said convex surface, and loosely retaining said boss in said socket and supporting said valve disk in gyratory relation with said hanger, limited in its movement by the engagement of said stud with the edge of said aperture.

4. In a valve provided with a casing having a seat and bearings in unitary relation therewith, the combination with a valve disk having a plane face arranged to engage said seat and provided with a boss forming a spherical segment and a threaded stud in unitary relation therewith, extending from the side opposite said face, of a hanger provided with trunnions suitably journaled in said bearings and having an aperture for said stud of larger diameter than said stud, surrounded by a concavo-convex portion whose opposite surfaces are concentric with said boss, and whose concave face forms a socket therefor, and a nut in threaded engagement with said stud and loosely retaining said boss in said socket and said disk in gyratory relation with said hanger, the gyration of said disk being limited by the extent of movement of said stud in said aperture.

5. In a valve comprising a casing having a seat and bearings integral therewith, the combination with a valve disk arranged to engage said seat and provided with a boss forming a spherical segment and a threaded stud in unitary relation therewith, of a hanger having trunnions suitably journaled in said bearings and free to oscillate in said casing and having an aperture for said stud of larger diameter than said stud, surrounded by a concavo-convex portion whose opposite faces are concentric with said boss, and which forms a socket for said boss, a nut in threaded engagement with said stud loosely retaining said boss in said socket and said disk in gyratory relation with said hanger and adjustable to vary their frictional engagement, and an oblong projection on the face of said disk opposite said stud arranged to be engaged to rotate said disk with respect to said hanger.

EDWARD J. KILEY.

Witnesses:
FREDERICK W. FRANKLIN,
EUGENE A. SULLIVAN.